US007116389B2

United States Patent
Kim et al.

(10) Patent No.: US 7,116,389 B2
(45) Date of Patent: Oct. 3, 2006

(54) LIQUID CRYSTAL DISPLAY DEVICE AND METHOD OF MANUFACTURING THE SAME

(75) Inventors: Jong Il Kim, Anyang-shi (KR); Oh Nam Kwon, Chonan-shi (KR)

(73) Assignee: LG.Phillips LCD Co., Ltd., Seoul (KR)

( * ) Notice: Subject to any disclaimer, the term of this patent is extended or adjusted under 35 U.S.C. 154(b) by 0 days.

(21) Appl. No.: 10/029,145

(22) Filed: Dec. 28, 2001

(65) Prior Publication Data

US 2002/0085142 A1    Jul. 4, 2002

(30) Foreign Application Priority Data

Dec. 28, 2000    (KR)    ............... 2000-84088

(51) Int. Cl.
 *G02F 1/1343*    (2006.01)
 *G02F 1/138*    (2006.01)
(52) U.S. Cl. ...................................... 349/143; 349/43
(58) Field of Classification Search .................. 349/43, 349/143, 187
 See application file for complete search history.

(56) References Cited

U.S. PATENT DOCUMENTS

| 5,135,581 A | * | 8/1992 | Tran et al. | 136/256 |
| 5,574,292 A | * | 11/1996 | Takahashi et al. | 257/59 |
| 5,811,836 A | * | 9/1998 | Ha | 257/59 |
| 5,972,527 A | * | 10/1999 | Kaijou et al. | 428/697 |
| 6,025,216 A | * | 2/2000 | Ha | 438/161 |
| 6,188,108 B1 | * | 2/2001 | Yoon et al. | 257/347 |
| 6,198,133 B1 | * | 3/2001 | Yamazaki et al. | 257/347 |
| 6,225,150 B1 | * | 5/2001 | Lee et al. | 438/153 |
| 6,297,519 B1 | * | 10/2001 | Fujikawa et al. | 257/59 |
| 6,310,674 B1 | * | 10/2001 | Suzuki et al. | 349/139 |
| 6,337,520 B1 | * | 1/2002 | Jeong et al. | 257/763 |
| 6,433,842 B1 | * | 8/2002 | Kaneko et al. | 349/43 |
| 2001/0029054 A1 | * | 10/2001 | Maeda et al. | 438/17 |
| 2001/0030717 A1 | * | 10/2001 | Kaneko et al. | 349/43 |
| 2002/0070197 A1 | * | 6/2002 | Ahn et al. | 216/13 |
| 2002/0085168 A1 | * | 7/2002 | Kim et al. | 349/187 |
| 2002/0175395 A1 | * | 11/2002 | Jeong et al. | 257/618 |

FOREIGN PATENT DOCUMENTS

| JP | 4-303825 A | 10/1992 |
| JP | 11-153803 A | 6/1999 |

* cited by examiner

*Primary Examiner*—Tarifur R. Chowdhury
*Assistant Examiner*—Mike Qi
(74) *Attorney, Agent, or Firm*—Birch, Stewart, Kolasch & Birch, LLP

(57) ABSTRACT

A method of manufacturing an LCD device is disclosed, which can improve yield by preventing occurrence of a contact failure between a transparent conductive film and a pad region (gate and data regions). In this method, amorphous transparent conductive films connected to a drain electrode, a gate pad and a data pad are formed of a transparent conductive material.

26 Claims, 7 Drawing Sheets

LIQUID CRYSTAL DISPLAY DEVICE AND METHOD OF MANUFACTURING THE SAME

RELATED APPLICATION

This application claims the benefit of the Korean Application No. P2000-084088 filed on Dec. 28, 2000, under 35 U.S.C. § 119, which is hereby incorporated by reference.

BACKGROUND OF THE INVENTION

1. Field of the Invention

The present invention relates to a liquid crystal display (LCD) device, and more particularly, to a method for manufacturing a pad region of an LCD device.

2. Discussion of the Related Art

In general, an LCD device according to a related art includes a lower substrate having a TFT and a pixel electrode, an upper substrate having a color filter film for displaying colors and a common electrode, and a liquid crystal film between the lower and upper substrates.

The LCD device according to the related art will now be described in more detail.

FIG. 1 is a layout of a TFT array region and a pad region in a lower substrate of a general LCD device.

To define a plurality of pixel regions, a plurality of gate lines 100 are formed on the lower substrate (not shown) at constant intervals, and a plurality of data lines 200 are formed perpendicular to the gate lines 100 at constant intervals. Then, a plurality of TFTs (thin film transistors) are formed at crossing points of the plurality of gate and data lines 100 and 200.

In each TFT, a gate electrode 2a projects from the gate line 100, and a semiconductor film 4 in an island shape is formed above the gate electrode 2a. A source electrode 6 projects from the data line 200 toward the semiconductor film 4, and a drain electrode 7 is formed in a portion where the source and drain electrodes 6 and 7 oppose each other. A pixel electrode 9a made of ITO is electrically connected to the drain electrode 7 of the TFT in the pixel region.

Although not shown, a plurality of black matrix films are formed, except in the pixel regions, to prevent light leakage from the upper substrate. Then, R/G/B color filter films are formed in the pixel regions between the black matrix films for displaying colors. A plurality of common electrodes are formed on the entire surface of the upper substrate including the color filter films.

Then, the lower and upper substrates are attached to each other with a certain constant distance therebetween, and then a liquid crystal is injected between the lower and upper substrates.

The above LCD device adjusts display conditions by applying a certain voltage to both ends of the lower and upper substrates. A conductive material that does not intercept light has to be deposited on the surfaces of the upper and lower (glass) substrates. Therefore, transparent electrodes are formed on the lower and upper substrates by sputtering. At this time, the common electrodes discussed above are formed on the upper substrate and the pixel electrode is formed on the lower substrate.

In the related art LCD device, the transparent electrode is formed of an indium tin oxide (ITO) film or $SnO_2$ film The ITO film obtains high conductivity, chemical stabilization and thermal stabilization. Furthermore, the ITO is easy to pattern, so that the ITO film as the transparent electrode can be used in both segment and dot matrix. The $SnO_2$ film obtains chemical stabilization and physical strength more than the ITO film, but its conductivity is less than that of the ITO. The $SnO_2$ film also has a problem of forming the electrode by photolithography. As such, the $SnO_2$ Film can not be used as the transparent electrode of a minute pattern in which a low resistance is required.

In general, the ITO film as the transparent electrode provides a low manufacturing cost, a good adhesion to the substrates and photoresists, a low resistance, a high transmittivity, and a uniformity of resistance value, transmittivity and etching ratio. The ITO film as the transparent electrode is also needed not to have an etching residue during the formation of a minute pattern, and is required not to have particles or defects on the surfaces certain layers.

FIG. 2 is a sectional view showing a structure of the related art LCD device taken along line I–I' (TFT region) and line II–II' (pad region) of FIG. 1.

As shown in FIG. 2, in the TFT region, a gate electrode 2a is formed on a lower glass substrate 1, and then a gate insulating film 3 is formed on the entire surface of the glass substrate 1 to cover the gate electrode 2a.

A semiconductor film 4 is formed on the gate insulating film 3 above the gate electrode 2a, and then source/drain electrodes 6 and 7 are formed at both sides of the semiconductor film 4. An ohmic contact film 5 is formed between the semiconductor film 4 and the source/drain electrodes 6 or 7.

A passivation film 8 having a contact hole 8a to expose the drain electrode 7 is formed over the glass substrate 1. A pixel electrode 9a is electrically connected with the drain electrode 7 through the contact hole 8a.

In the pad region, a gate pad 2b or a data pad 2c is formed of the same material as a gate line or a data line. As an example, FIG. 2 illustrates the gate pad 2b. The gate insulating film 3 is formed on the glass substrate 1 to cover the gate pad 2b, and then the passivation film 8 having a contact hole 8b to expose the gate pad 2b is formed on the gate insulating film 3. A pad contact film 9b is formed of the same material as the pixel electrode 9a on the gate pad 2b.

As shown in FIG. 2, in the related art LCD device, the gate insulating film 3 and the passivation film 8 are formed of a silicon nitride film. The source/drain electrodes 6 and 7, the gate electrode 2a and the gate pad 2b are formed of a conductive metal such as Cu or Ti. The pixel electrode 9a and the pad contact film 9b are formed of a transparent conductive film such as ITO.

A method for manufacturing the related art LCD device of FIG. 1 will now be described as follows.

A gate electrode material such as Al, Cr or Al alloy is deposited on the entire surface of the substrate 1 by sputtering, and a photoresist (not shown) is deposited. Then, the gate line 100, the gate electrode 2a and the gate pad 2b are formed by photolithography. A silicon nitride film SiNx or a silicon oxide film SiOx is deposited on the entire surface of the substrate 1 including the gate line 100, the gate electrode 2a and the gate pad 2b by a plasma enhanced chemical vapor deposition (PECVD), thereby forming the gate insulating film 3.

The semiconductor film 4 and the ohmic contact film 5 are sequentially deposited over the substrate 1, and then patterned to remain on the gate electrode 2a and the gate insulating film 3.

Subsequently, Al, Cr or Al alloy is deposited over the substrate 1 by sputtering and then is selectively removed to pattern the data line 200 and the source/drain electrodes 6 and 7. Then, the ohmic contact film 5 is removed between the source and drain electrodes 6 and 7.

The passivation film 8 is formed on the entire surface of the substrate including the source and drain electrodes 6 and 7. Then the passivation film 8 and the passivation/gate insulating films 8 and 3 are selectively removed to respectively expose the drain electrode 7 and the gate pad 2b of the pad region through the contact holes 8a and 8b.

A polycrystal ITO is deposited on the entire surface of the substrate including the contact holes by sputtering, and then is patterned, so that the pixel electrodes 9a connected to the drain electrode 7 is formed in the TFT region, simultaneously, the pad contact film 9b connected to the gate pad 2b is formed in the pad region. At this time, the polycrystal ITO is deposited at a thickness of 500 Å.

However, the related art LCD device has the following problems.

The pixel electrode and the pad contact film are formed of polycrystal ITO, so that a stripper diffuses and penetrates a grain boundary of the polycrystal ITO during a removal of the photoresist by patterning the pixel electrode and the pad contact film. Therefore, the stripper generates a galvanic effect with the pad, so that miniature gaps are formed at an interface between the pad contact film and the pad region, causing a contact failure indicated as reference numeral 10 in FIG. 2. It can also cause a change in TFT characteristics and a degraded yield.

SUMMARY OF THE INVENTION

Accordingly, the present invention is directed to an LCD device that substantially obviates one or more problems due to limitations and disadvantages of the related art.

An object of the present invention is to provide an LCD device and a method for manufacturing the same that can improve the capacity of a TFT and the device yield.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, an LCD device according to an embodiment of the present invention includes a substrate, a TFT having a gate electrode and source/drain electrodes on the substrate, a passivation film formed on an entire surface of the substrate and having a contact hole in the drain electrode of the TFT, and a pixel electrode connected to the drain electrode through the contact hole for forming an amorphous transparent conductive film.

In another aspect of the present invention, a pad structure of an LCD device includes a substrate, a metal film formed on the substrate, and an amorphous transparent conductive film formed on the metal film.

In other aspect of the present invention, a method for manufacturing an LCD device includes the steps of forming a gate line including a gate electrode and a gate pad on a substrate, depositing a gate insulating film on an entire surface of the substrate, forming a semiconductor film above the gate electrode, forming a data line including a data pad to form source and drain electrodes of a TFT at both sides above the semiconductor film, forming a passivation film on the entire surface of the substrate, forming each contact hole in the drain electrode of the TFT, the gate pad and the data pad, and forming amorphous transparent conductive films in each pixel region, connected to the drain electrode through the gate pad and data pad.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE PREFERRED EMBODIMENTS

Reference will now be made in detail to the preferred embodiments of the present invention, examples of which are illustrated in the accompanying drawings.

Figure 1:
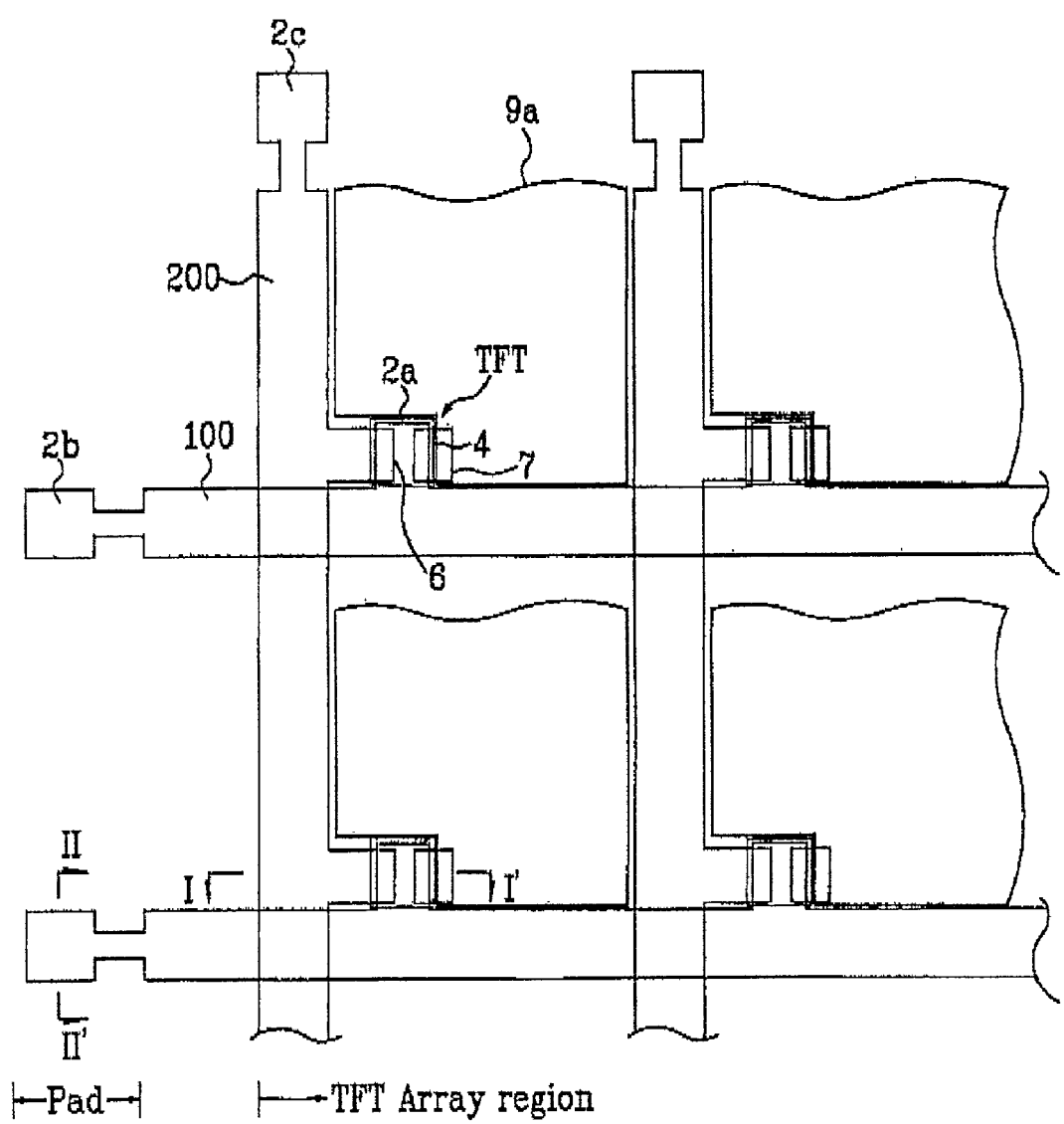
FIG. 1 is a layout of a general LCD device.
Figure 2:
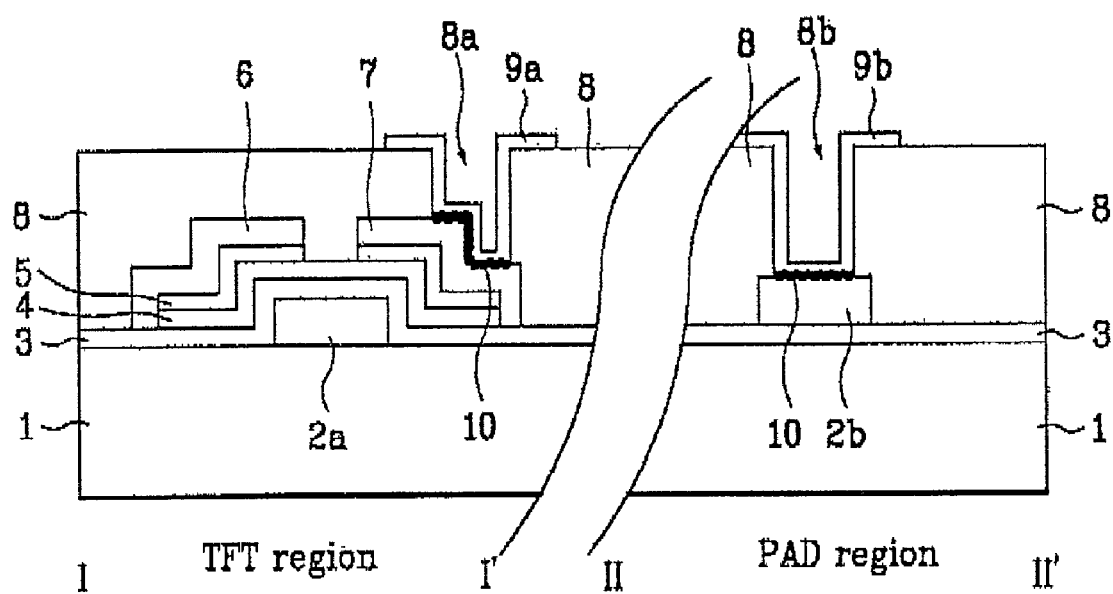
FIG. 2 is a sectional view showing a structure of a related art LCD device taken along lines I–I' (TFT region) and II–II' (pad region) of FIG. 1.
Figure 3:
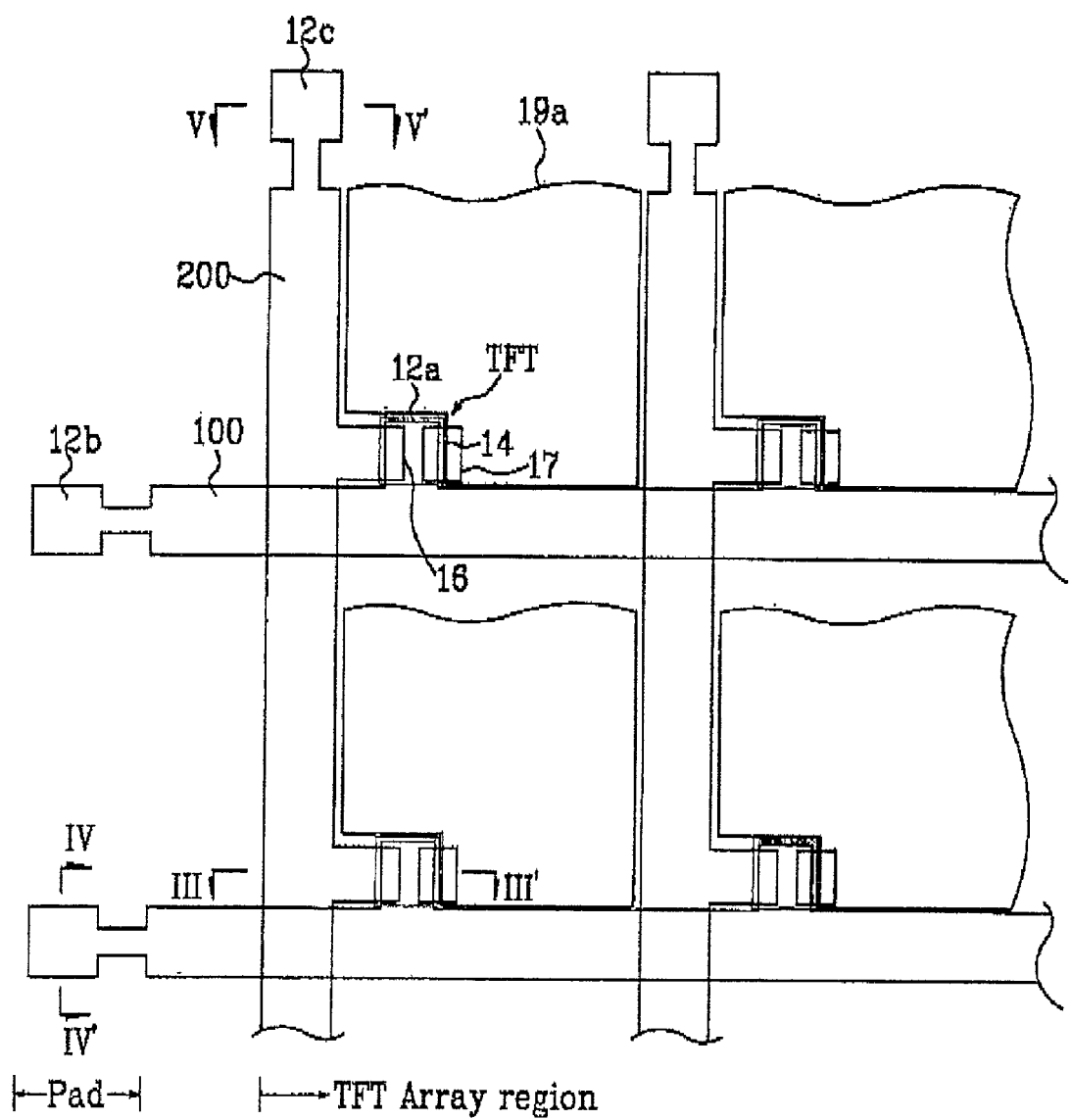
FIG. 3 is a layout of an LCD device according to an embodiment of the present invention.

FIG. 3 is a layout of an LCD device according to an embodiment of the present invention. As shown in FIG. 3, the LCD device includes a plurality of gate and data lines 100 and 200 crossing each other and TFTs each disposed in a pixel area of the LCD device.

FIG. 3A to FIG. 3D are sectional views showing manufacturing process steps of the LCD device according to an embodiment of the present invention, taken along lines III–III' (TFT region) and IV–IV' (gate pad region) of FIG. 3.

Figure 3A:
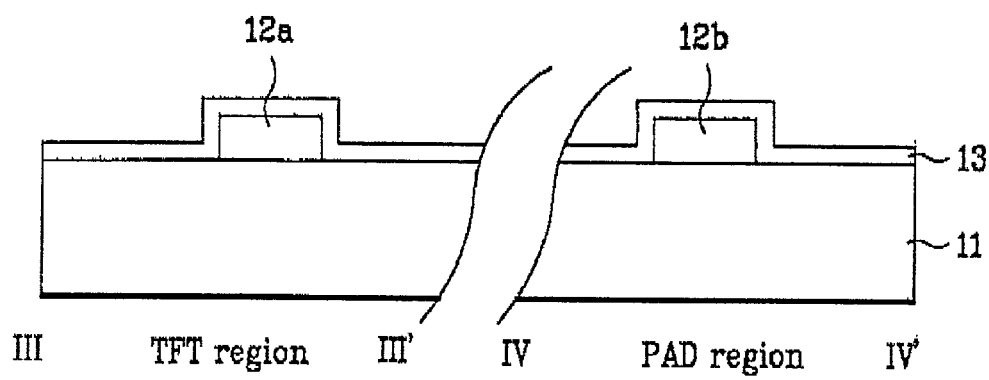
FIG. 3A to FIG. 3D are sectional views showing manufacturing process steps of the LCD device according to an embodiment of the present invention, taken along lines III–III' (TFT region) and IV–IV' (gate pad region) of FIG. 3.

As shown in FIG. 3A, a material for forming a gate line (100) is deposited on a glass substrate 11 as a single film of Cu or CU/Ti, or as a deposition film sequentially formed of Cu and Cu/Ti by using sputtering or other techniques. Then, photolithography is performed to form the gate line, a gate electrode 12a and a gate pad 12b. A gate insulating film 13 made of a silicon nitride film, silicon oxide film, etc. is formed on the entire surface of the glass substrate 11 including the gate electrode 12a and the gate pad 12b. Although the glass substrate 11 is preferred as a substrate, the substrate may be formed with other materials.

Figure 3B:
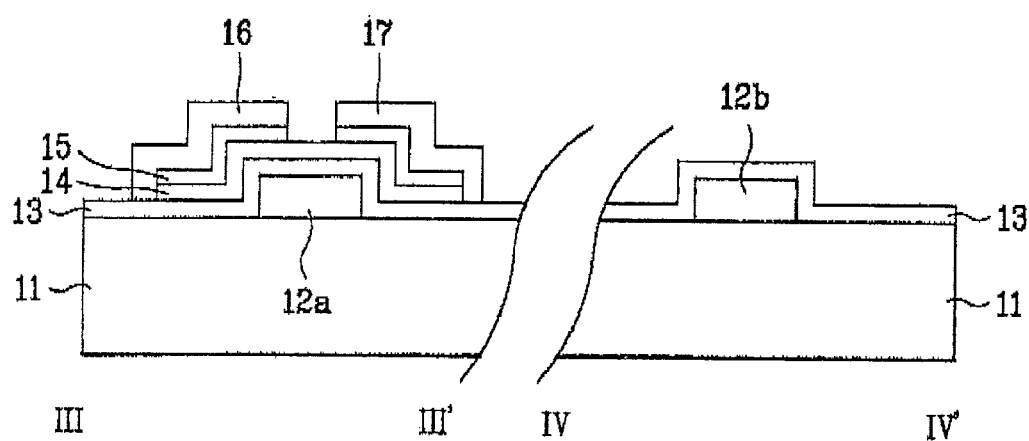

As shown in FIG. 3B, a semiconductor film 14 and an ohmic contact film 15 are sequentially formed on the gate insulating film 13, and then are patterned to remain above the gate electrode 12a in an island shape.

Then, Al, Cr or Al alloy is deposited on the glass substrate 1 by using sputtering or other techniques, and then is selectively removed to pattern a data line 200 and source/ drain electrodes 16 and 17. The ohmic contact film 15 is removed between the source and drain electrodes 16 and 17.

Figure 3C:
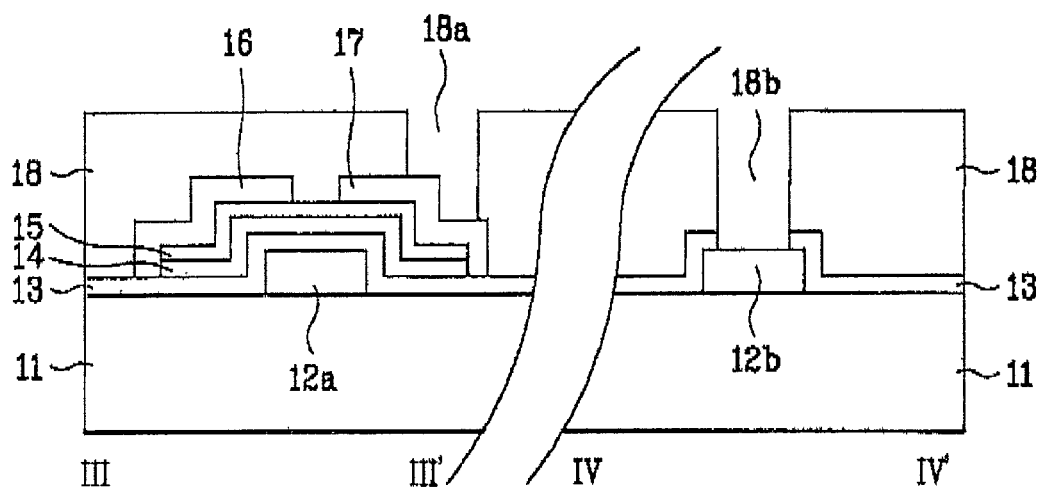

As shown in FIG. 3C, a passivation film 18 is formed on the entire surface of the glass substrate 1 including the source and drain electrodes 16 and 17, and contact holes 18a and 18b are formed to expose the drain electrode 17 and the gate pad 12b of the pad region, respectively, by selectively removing the passivation film 18 and the passivation/gate insulating films 18 and 13.

Figure 3D:
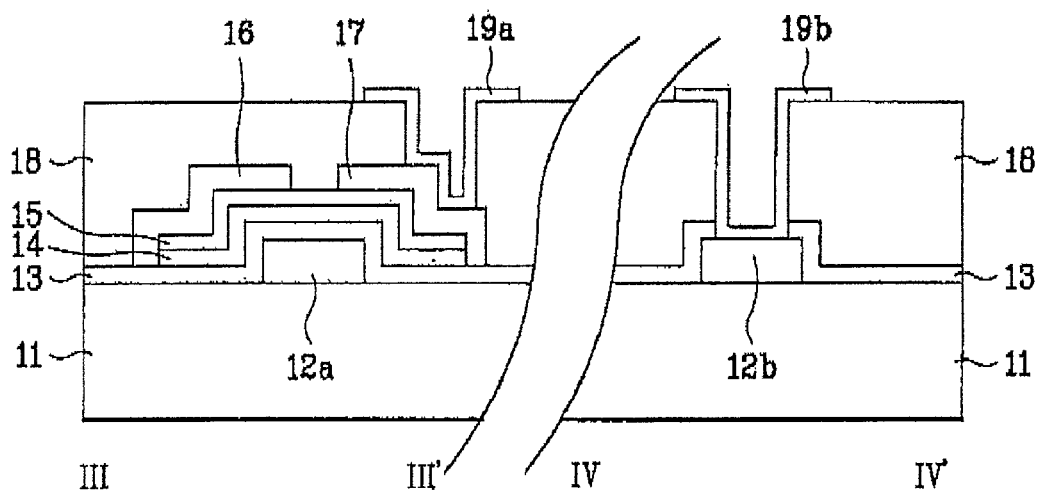

As shown in FIG. 3D, transparent electrodes are deposited on the entire surface of the glass substrate 1 including the contact holes 18a and 18b by using sputtering or other techniques, and are patterned, thereby forming a pixel electrode 19a electrically connected to the drain electrode 17 in the TFT region, and a pad contact film 19b electrically connected to the gate pad 12b in the pad region.

The pixel electrode 19a and the pad contact film 19b are formed of any one of amorphous ITO, amorphous indium zinc oxide (IZO), or amorphous indium tin zinc oxide (ITZO). The amorphous ITO is formed of any one of ITO having $H_2O$, ITO having $H_2$, or ITO formed at a normally known temperature.

The pixel electrode 19a and the pad contact film 19b are formed at a thickness of approximately 500 Å to 2000 Å, and a thermal process is performed on the above amorphous transparent conductive film at a temperature between about 150° and 350° to obtain the resistance and transmittivity equal to those of a polycrystal transparent conductive film.

The TFT region and the data pad region of the LCD device in FIG. 3 will be described in detail referring to FIGS. 4A–4D.

FIG. 4A to FIG. 4D are sectional views showing manufacturing process steps of the LCD device according to the embodiment of the present invention, taken along lines III–III' (TFT region) and V–V' (data pad region) of FIG. 3.

Figure 4A:
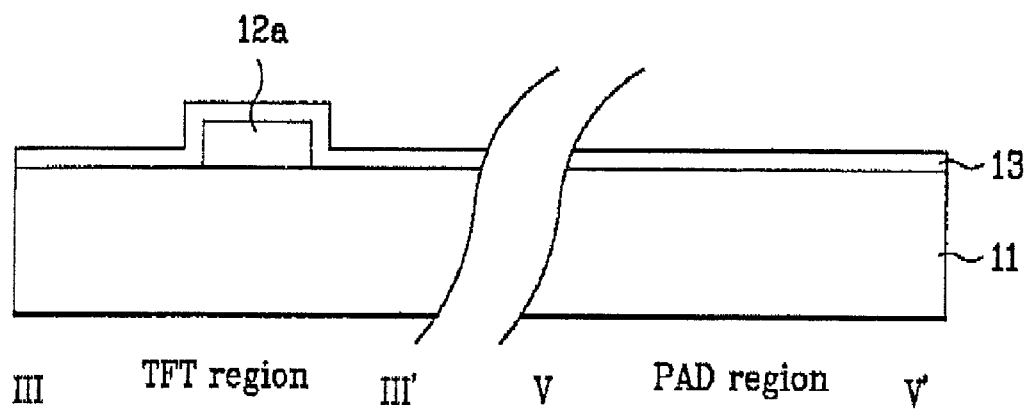
FIG. 4A to FIG. 4D are sectional views showing manufacturing process steps of the LCD device according to the embodiment of the present invention, taken along lines III–III' (TFT region) and V–V' (data pad region) of FIG. 3.

As shown in FIG. 4A, a material for forming a gate line is deposited on the glass substrate 11 as a single film formed of Cu or Cu/Ti, or as a deposition film sequentially formed of Cu and Cu/Ti by using sputtering or other techniques. Then photolithography is performed to form the gate line, the gate electrode 12a and the gate pad 12b (FIG. 3A). The gate insulating film 13 made of a silicon nitride film or silicon oxide film is formed on the entire surface of the glass substrate 11 including the gate electrode 12a and the gate pad 12b.

Figure 4B:
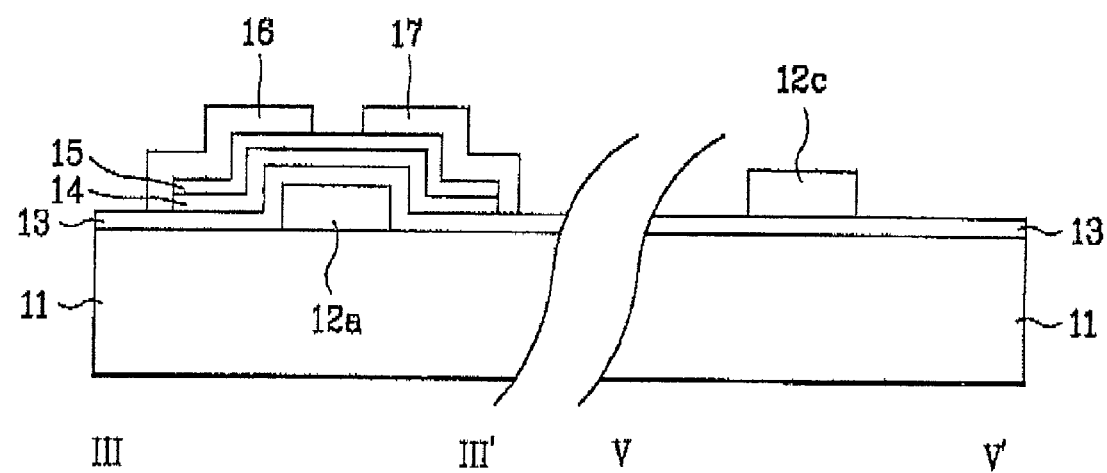

As shown in FIG. 4B, the semiconductor film 14 and the ohmic contact film 15 are sequentially formed on the gate insulating film 13, and then patterned to remain above the gate electrode 12a in an island shape.

Then, Al, Cr or Al alloy is deposited on the glass substrate 1 by using sputtering or other techniques, and then selectively removed to pattern a data line (200), a data pad 12c and source/drain electrodes 16 and 17. The ohmic contact film 15 is then formed between the source and drain electrodes 16 and 17.

Figure 4C:
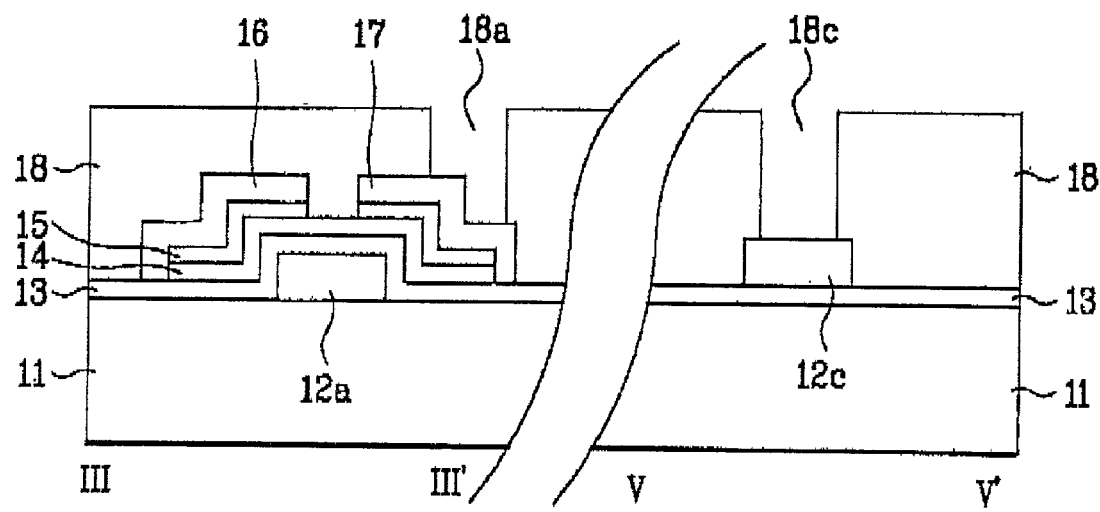

As shown in FIG. 4C, the passivation film 18 is formed on the entire surface of the glass substrate 1 including the source and drain electrodes 16 and 17, and is selectively removed to expose the drain electrode 17 and the data pad 12c of the pad region through contact holes 18a and 18c, respectively.

Figure 4D:
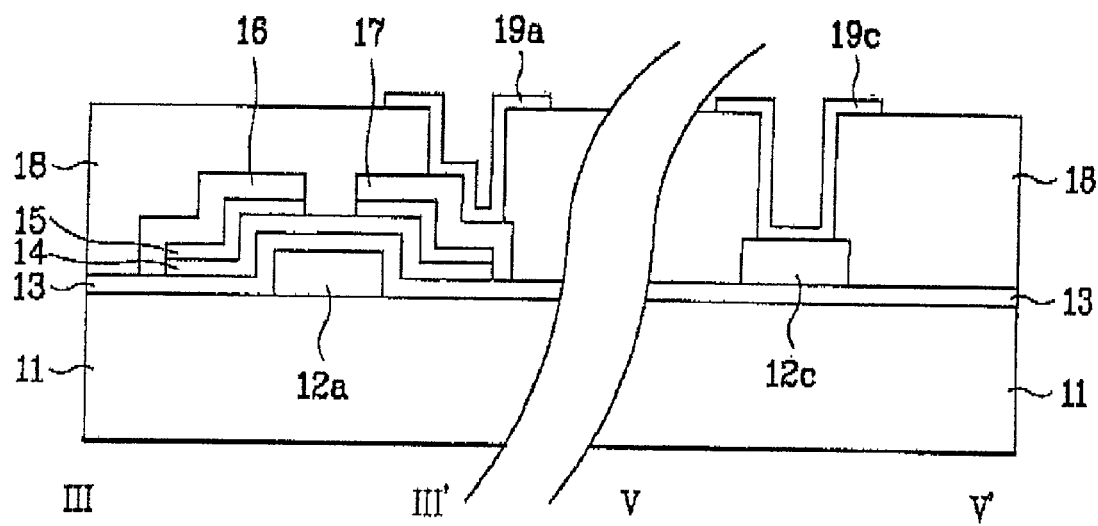

As shown in FIG. 4D, transparent electrodes are deposited on the entire surface of the glass substrate 1 including the contact holes 18a and 18b by using sputtering or other techniques, and are patterned, thereby forming the pixel electrode 19a electrically connected to the drain electrode 17 in the TFT region, and the pad contact film 19c electrically connected to the data pad 12c in the pad region.

Here, the pixel electrode 19a and the pad contact film 19c are formed of any one of amorphous ITO, amorphous indium zinc oxide (IZO), or amorphous indium tin zinc oxide (ITZO). The amorphous ITO is formed of any one of ITO having $H_2O$, ITO having $H_2$, or ITO formed at a normally known temperature.

The pixel electrode 19a and the pad contact film 19c are formed at a thickness of approximately 500 Å to 2000 Å. A thermal process is performed to the above amorphous transparent conductive film at a temperature between about 150° and 350° to obtain the resistance and transmittivity equal to those of polycrystal transparent conductive film.

In a different embodiment, the amorphous transparent conductive film may not be used to form the pixel electrode and pad contact films. Instead, a polycrystal ITO film which is thicker than the polycrystal ITO film of the related art may be used, thereby overcoming the related art problems. For instance, if the polycrystal ITO film having a thickness at least 500 Å to 2500 Å is used, a generation of the galvanic effect can be prevented, thereby preventing occurrence of contact failures in the pad and TFT regions.

As discussed above, in the method for manufacturing the LCD device according to the present invention, the pixel electrode and the pad contact films are formed of an amorphous transparent conductive film such as an amorphous ITO film, an amorphous IZO film or an amorphous ITZO film, so that a contact failure can be significantly reduced.

As mentioned above, the method for manufacturing the LCD device according to the present invention has at least the following advantages.

The pixel electrode and the pad contact films are formed of the amorphous transparent conductive films, so that a stripper cannot be diffused and penetrated to the amorphous transparent conductive films during a removal of the photoresist, thereby improving interface characteristics between the transparent conductive films and the gate/data pad. Therefore, it is possible to prevent occurrence of contact failures between the transparent conductive films and the gate/data pad, thereby improving the capacity of the TFT and device yield.

The forgoing embodiments are merely exemplary and are not to be construed as limiting the present invention. The present teachings can be readily applied to other types of apparatuses. The description of the present invention is intended to be illustrative, and not to limit the scope of the claims. Many alternatives, modifications, and variations will be apparent to those skilled in the art.

What is claimed is:

1. An LCD device comprising:
   a substrate;
   a TFT having a gate electrode and source/drain electrodes on the substrate;
   a passivation film formed on an entire surface of the substrate and having a contact hole in the drain electrode of the TFT; and
   a pixel electrode made of an amorphous transparent conductive film of sufficient thickness to prevent a generation of a galvanic effect, and connected to the drain electrode through the contact hole, the drain electrode having a single-layer structure.

2. The LCD device as claimed in claim 1, wherein the pixel electrode is formed of ITO in which $H_2O$ is added.

3. The LCD device as claimed in claim 1, wherein the pixel electrode is formed of ITO in which $H_2$ is added.

4. The LCD device as claimed in claim 1, wherein the pixel electrode is formed of ITO produced at a predetermined temperature.

5. The LCD device as claimed in claim 1, wherein the pixel electrode is formed of any one of amorphous IZO and amorphous ITZO.

6. The LCD device as claimed in claim 1, wherein the pixel electrode has a thickness of approximately 500 Å to 2000 Å.

7. The LCD device as claimed in claim 1, wherein the pixel electrode is formed of a polycrystal transparent conductive film having a thickness of above 500Å to 2500 Å.

8. A pad structure of an LCD device, comprising:
a substrate:
a metal film formed on the substrate and functioning as a pad for the LCD device; and
an amorphous transparent conductive film of sufficient thickness to prevent a generation of a galvanic effect, and formed on the metal film,
wherein the metal film is formed of a same material as a gate line or a data line.

9. The pad structure as claimed in claim 8, wherein the amorphous transparent conductive film is formed of ITO in which $H_2O$ is added.

10. The pad structure as claimed in claim 8, wherein the amorphous transparent conductive film is formed of ITO in which $H_2$ is added.

11. The pad structure as claimed in claim 8, wherein the amorphous transparent conductive film is formed of ITO produced at a predetermined temperature.

12. The pad structure as claimed in claim 8, wherein the amorphous transparent conductive film is formed of any one of amorphous IZO and amorphous ITZO.

13. The pad structure as claimed in claim 8, wherein the metal film has a single-layer structure.

14. The pad structure as claimed in claim 8, wherein the amorphous transparent conductive film has a thickness of approximately 500 Å and 2000 Å.

15. The pad structure as claimed in claim 8, wherein a polycrystal transparent conductive film having a thickness of above 500 Å to 2500 Å is formed instead of the amorphous transparent conductive film.

16. A method for manufacturing an LCD device, comprising the steps of:
forming a gate line including a gate electrode and a gate pad on a substrate;
forming a gate insulating film on an entire surface of the substrate;
forming a semiconductor film above the gate electrode;
forming a data line including a data pad to form source and drain electrodes of a TFT at both sides above the semiconductor film;
forming a passivation film on the entire surface of the substrate;
forming contact holes in the drain electrode, the gate pad and the data pad of the TFT; and
forming, in each pixel region, amorphous transparent conductive films of sufficient thickness to prevent a generation of a galvanic effect, and connected to the drain electrode, the gate pad and the data pad through the contact holes,
wherein at least one of the drain electrode, the gate pad and the data pad has a single-layer structure.

17. The method as claimed in claim 16, wherein at least one of the amorphous transparent conductive films is formed of ITO in which $H_2O$ is added.

18. The method as claimed in claim 16, wherein at least one of the amorphous transparent conductive films is formed of ITO in which $H_2$ is added.

19. The method as claimed in claim 16, wherein at least one of the amorphous transparent conductive films is formed of ITO produced at a predetermined temperature.

20. The method as claimed in claim 16, wherein at least one of the amorphous transparent conductive films is formed of any one of amorphous IZO and amorphous ITZO.

21. The method as claimed in claim 16, further comprising the step of:
performing a thermal process to at least one of the amorphous transparent conductive films at a temperature of around 150° to 350°.

22. The method as claimed in claim 16, wherein at least one of the amorphous transparent conductive films is formed at a thickness of approximately 500 Å to 2000Å.

23. The method as claimed in claim 16, wherein a polycrystal transparent conductive film having a thickness of above 500 Å and 2500 Å is formed instead of at least one of the amorphous transparent conductive films.

24. An LCD device comprising:
a substrate;
a TFT having a gate electrode and source/drain electrodes on the substrate;
a passivation film formed on an entire surface of the substrate and having a contact hole in the drain electrode of the TFT; and
a pixel electrode made of a polycrystalline transparent conductive film of sufficient thickness to prevent generation of a galvanic effect by a stripper, and connected to the drain electrode through the contact hole, the drain electrode having a single-layer structure.

25. A pad structure of an LCD device, comprising:
a substrate;
a metal film formed on the substrate and functioning as a pad for the LCD device; and
a polycrystalline transparent conductive film having a thickness sufficient to prevent generation of a galvanic effect by a stripper, and formed on the metal film,
wherein the metal film is formed of a same material as a gate line or a data line.

26. A method for manufacturing an LCD device, comprising the steps of:
forming a gate line including a gate electrode and a gate pad on a substrate;
forming a gate insulating film on an entire surface of the substrate;
forming a semiconductor film above the gate electrode;
forming a data line including a data pad to form source and drain electrodes of a TFT at both sides above the semiconductor film;
forming a passivation film on the entire surface of the substrate;
forming contact holes in the drain electrode, the gate pad and the data pad of the TFT; and
forming, in each pixel region, polycrystalline transparent conductive films of sufficient thickness to prevent generation of a galvanic effect by a stripper, and connected to the drain electrode, the gate pad and the data pad through the contact holes,
wherein at least one of the drain electrode, the gate pad and the data pad has a single-layer structure.

* * * * *